(12) United States Patent
Selkirk et al.

(10) Patent No.: US 6,912,537 B2
(45) Date of Patent: Jun. 28, 2005

(54) DYNAMICALLY CHANGEABLE VIRTUAL MAPPING SCHEME

(75) Inventors: Stephen S. Selkirk, Broomfield, CO (US); Charles A. Milligan, Golden, CO (US); Perry Merritt, Broomfield, CO (US); Edward T. Gladstone, Westminster, CO (US); James B. Lenehan, Erie, CO (US); Kenneth Willis, Castle Rock, CO (US)

(73) Assignee: Storage Technology Corporation, Louisville, CO (US)

( * ) Notice: Subject to any disclaimer, the term of this patent is extended or adjusted under 35 U.S.C. 154(b) by 191 days.

(21) Appl. No.: 09/751,772

(22) Filed: Dec. 29, 2000

(65) Prior Publication Data

US 2002/0087544 A1 Jul. 4, 2002

Related U.S. Application Data

(60) Provisional application No. 60/212,750, filed on Jun. 20, 2000.

(51) Int. Cl.$^7$ ................................................ G06F 7/00
(52) U.S. Cl. ....................................... 707/100; 711/203
(58) Field of Search ............................. 707/100, 1–10, 707/104.1, 205; 711/202, 203–207, 112–114, 144, 161, 162, 165; 709/201, 213–218, 226

(56) References Cited

U.S. PATENT DOCUMENTS

| | | | |
|---|---|---|---|
| 5,403,639 A | | 4/1995 | Belsan et al. |
| 5,987,506 A | * | 11/1999 | Carter et al. ................ 709/213 |
| 5,996,054 A | * | 11/1999 | Ledain et al. ............... 711/203 |
| 6,532,527 B2 | * | 3/2003 | Selkirk et al. .............. 711/203 |

FOREIGN PATENT DOCUMENTS

EP 0851366 A1 7/1998

OTHER PUBLICATIONS

Shinkai, Y. et al.: "HAMFS File System"; Reliable Distributed Systems, 1999. Proceedings of the 18$^{th}$ IEEE Symposium on Lausanne, Switzerland, Oct. 19–22, 1999, Los Alamitos, CA, USA, IEEE Compt. Soc., US, pp. 190–201, XP010356993, ISBN: 0–7695–0290–3.

Hartman, JH et al.: "The Zebra Striped Network File System", ACM Transactions on Computer Systems, Association for Computing Machinery, New York, US, vol. 13, no. 3, Aug. 1, 1995, pp. 274–310, XP000558454, ISSN: 0734–2071.

Jeong, TI et al.: "A Block Management Mechanism for Multimedia Files", IEICE Transactions on Information and Systems, Institute of Electronics Information and Comm. Eng. Tokyo, JP, vol. E78–D, No. 11, Nov. 1, 1995, pp. 1498–1508, XP000553534.

* cited by examiner

*Primary Examiner*—Uyen Le
*Assistant Examiner*—Susan Y Chen
(74) *Attorney, Agent, or Firm*—Yee & Associates, P.C.

(57) ABSTRACT

A system is provided to support dynamically changeable virtual mapping schemes in a data processing system. The present invention separates processing of data unit requirements from the selection of which storage subsystems to use for storage by using a storage methodologies inventory. A stored data management subsystem contains one or more hosts. A plurality of data storage elements is functionally coupled to the one or more hosts. The plurality of data storage elements is organized using a plurality of layers of mapping tables. The plurality of layers of mapping tables provides unique identification of location of the data such that individual data entries in a mapping table is variable and self-defining with respect to the amount of data managed.

18 Claims, 14 Drawing Sheets

FIG. 13

| TIMESTAMP | | | |
|---|---|---|---|
| LBA OF PREVIOUS STRIPE | | | |
| PREVIOUS STRIPE LUN | INDEX OF PARITY DRIVE | RAID TYPE OF STRIPE | # OF STRIPS IN STRIP |
| STRIP SIZE IN BLOCKS | | | |
| 1st LUN IN STRIPE | ACTIVE COUNT | # OF HOST PIECES IN STRIP | UNUSED |
| LBA OF DATA ON 1st LUN | | | |
| 2nd LUN IN STRIPE | ACTIVE COUNT | # OF HOST PIECES IN STRIP | UNUSED |
| LBA OF DATA ON 2nd LUN | | | |
| Nth LUN IN STRIPE | ACTIVE COUNT | # OF HOST PIECES IN STRIP | UNUSED |
| LBA OF DATA ON Nth LUN | | | |
| HOST LUN | LENGTH IN STRIP | HOST LENGTH | |
| HOST LBA | | | |
| HOST LUN | LENGTH IN STRIP | HOST LENGTH | |
| HOST LBA | | | |

DYNAMICALLY CHANGEABLE VIRTUAL MAPPING SCHEME

CROSS REFERENCE TO RELATED APPLICATIONS

This application claims the benefit of the filing date of corresponding U.S. Provisional Patent Application No. 60/212,750, entitled "Multi-layer Mapping Functions", filed Jun. 20, 2000. In addition, the present invention is related to applications entitled A SYSTEM TO SUPPORT DYNAMICALLY FLEXIBLE DATA DEFINITIONS AND STORAGE REQUIREMENTS, Ser. No. 09/751,635, FLOATING VIRTUALIZATION LAYERS, Ser. No. 09/752,071, and SELF DEFINING DATA UNITS, Ser. No. 09/751,641, which are filed even date hereof assigned to the same assignee and incorporated herein by reference.

BACKGROUND OF THE INVENTION

1. Technical Field

The present invention relates generally to an improved data processing system and in particular to a data storage subsystem for use with a data processing system. Still more particularly, the present invention provides a dynamically changeable virtual mapping scheme in a data processing system.

2. Description of Related Art

In computer systems and data storage subsystems, one problem is performing a data file copy operation in a manner that minimizes the use of processing resources and data storage memory. Previously, data files were copied in their entirety by the processor, such that two exact copies of the selected data file were resident in the data storage memory. This operation consumed twice the amount of memory for the storage of two identical copies of the data file. Additionally, this operation required the intervention of the processor to effect the copy of the original data file.

A data file snapshot copy is an improvement over this type of copy process. This snapshot copy process includes a dynamically mapped virtual data storage subsystem. This subsystem stores data files received from a processor in back-end data storage devices by mapping the processor assigned data file identifier to a logical address that identifies the physical storage location of the data. This dynamically mapped virtual data storage subsystem performs a copy of a data file by creating a duplicate data file pointer to a data file identifier in a mapping table to reference the original data file. In this dynamically mapped virtual data storage subsystem, the data files are referred to as a collection of "virtual tracks" and each data file is identified by unique virtual track addresses (VTAs). The use of a mapping table provides the opportunity to replace the process of copying the entirety of a data file in the data storage devices with a process that manipulates the contents of the mapping table. A data file appears to have been copied if the name used to identify the original data file and the name used to identify the copy data file are both mapped to the same physical data storage location.

This mechanism enables the processor to access the data file via two virtual track addresses while only a single physical copy of the data file resides on the back-end data storage devices in the data storage subsystem. This process minimizes the time required to execute the copy operation and the amount of memory used since the copy operation is carried out by creating a new pointer to the original data file and does not require any copying of the data file itself.

One implementation of the snapshot copy process provides a two-table approach. One table has table entries for each virtual device track pointing to another table containing the physical track location for the entry. Each physical track table entry identifies the number of virtual track entries that point to this entry by use of a reference count mechanism. Each virtual track entry that points to the physical track is called a "reference." The reference count increments when a new virtual track table entry pointer points to this physical entry (e.g. snap) and the reference count decrements when a virtual track table entry pointer is removed (e.g. update source after a snap). When a reference count is zero, then that physical track can be deleted from the back-end since it is known that there are no references to the physical track.

System administrators are beginning to realize that "point in time" or "instant" copies of data are extremely useful. However, the system administrator has to specifically plan for and request execution of these copies at the host level, such as setting up mirrored volumes or using the snapshot commands available in virtual mapping subsystems.

In addition, when attempting to provide the benefits of virtualized data storage, some type of mapping scheme is required. One of the problems with some of the existing mapping schemes is the additional processing overhead needed to process the mapping algorithm or following the mapping pointers to find the location of the desired data. Some of the mapping schemes force the manipulation of many pointers in order to perform operations on large sets of mapped data. Some mapping schemes also force the allocation of mapping tables for all possible virtual addresses whether or not those addresses are actually used.

In addition, RAID (redundant array of inexpensive disks) disk subsystems are traditionally organized by a set of disk drives into a RAID group. The RAID group can be viewed as a single logical unit. Furthermore, the capacities of disk drives have been increasing to such a size that operating systems of file systems may not utilize all of the space of a RAID group. In an attempt to resolve this, some RAID products are capable of partitioning a bound drive set into multiple logical units.

In most cases, with RAID products partitioning a bound drive into a set of multiple logical units, the RAID subsystem requires all units to be homogenous. In only a few cases, heterogeneous logical units with similar attributes can be combined in a RAID group. In general, these units need to meet the lowest common denominator of capacity to have a consistent device relative address for RAID stripe allocation.

However, the one exception to this method of associating RAID groups is the HP AutoRAID. The HP AutoRAID has a close analogy to the storage pool invention defined here but is different in concept. In HP AutoRAID, all drives comprise the basis to one of two RAID sets. There is one RAID one and one RAID five set. Drives are partitioned into groups on request. The AutoRAID does not provide a common space capacity. Capacity is managed across all units to satisfy the RAID group requirement.

Therefore, it would be advantageous to have a storage management system in which the number of table entries to be manipulated to perform storage management operations is reduced.

SUMMARY OF THE INVENTION

The present invention provides a system to support dynamically changeable virtual mapping schemes in a data processing system. The present invention separates processing of data unit requirements from the selection of which storage subsystems to use for storage by using a storage methodologies inventory. A stored data management subsystem contains one or more hosts. A plurality of data storage elements is functionally coupled to the one or more hosts. The plurality of data storage elements is organized using a plurality of layers of mapping tables. The plurality of layers of mapping tables provides unique identification of location of the data such that individual data entries in a mapping table is variable and self-defining with respect to the amount of data managed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 13 which is an exemplary meta-data block in accordance with a preferred embodiment of the present invention.

DETAILED DESCRIPTION OF THE PREFERRED EMBODIMENT

Figure 1:
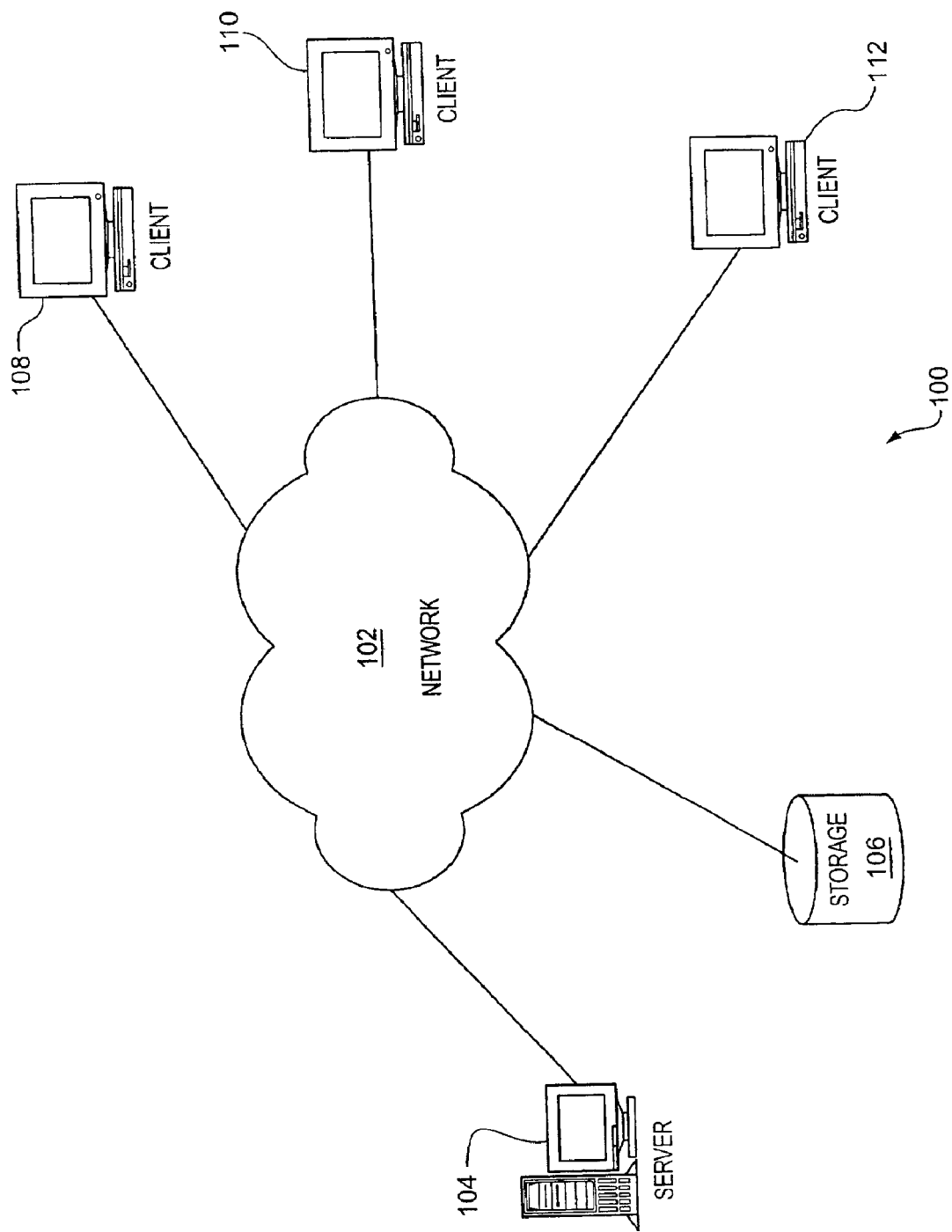
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers. FIG. 1 is intended as an example and not as an architectural limitation for the present invention.

Figure 2:
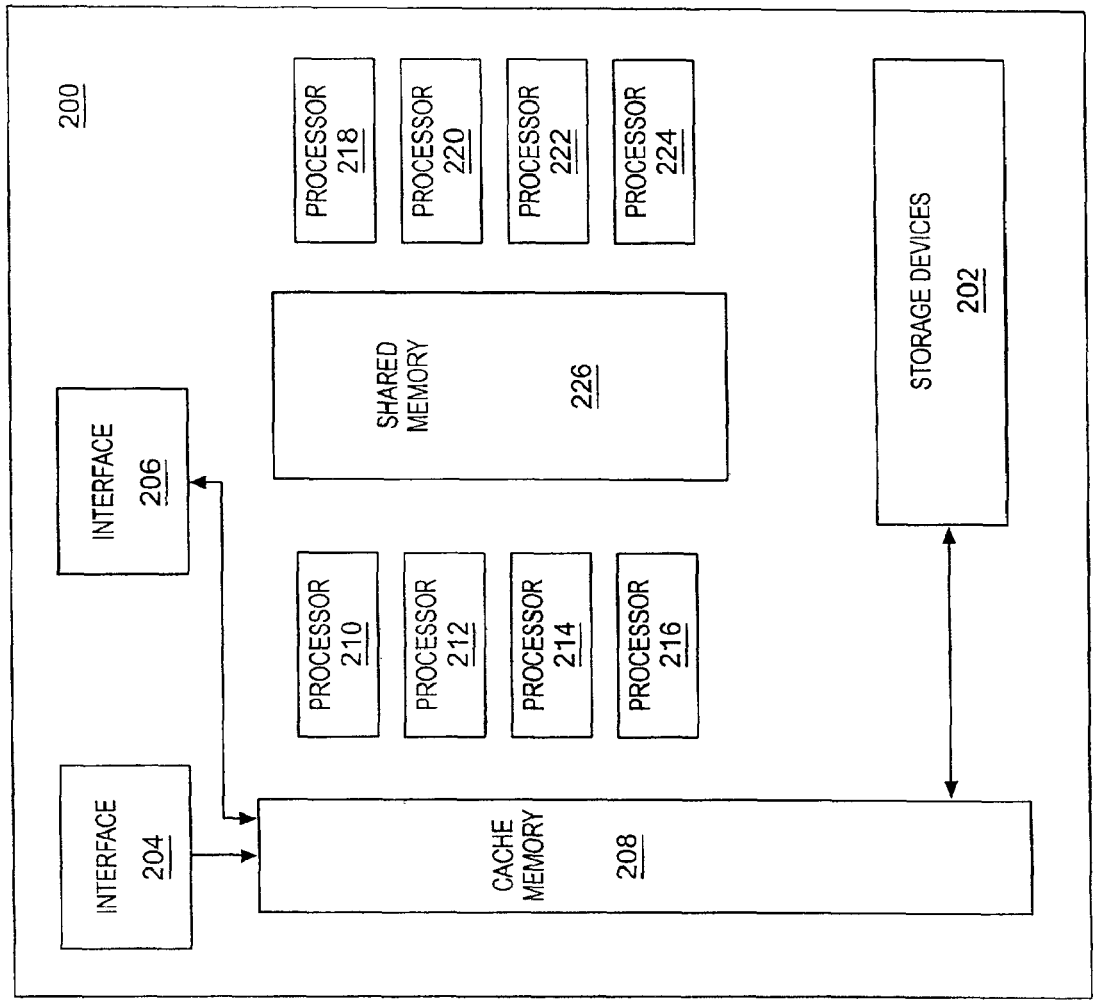
FIG. 2 is a block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 108 in FIG. 1, as a number of virtual devices. In this example, storage devices 202 are a set of disk drives set up as a redundant array of inexpensive disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202.

The present invention manages virtual storage facilities comprising an organization of computer equipment, for example, a host network, data transfer means, storage controller means, permanent storage means and attachment means connecting these devices together. The data storage facilities also may include management information associated with data units such that the management information provides an inventory of capabilities with upper and lower boundaries that may limit the options available to store the data and still meet a user's criteria. For purposes of this application, a data unit is a logical entity known to a owning entity that is composed of a number of data elements and meta-data and a data element is a grouping of data bits or bytes that the subsystem chooses to manage as a consistent set. Such management information may be independent of attributes of or characteristics of the devices in the physical storage subsystem actually used to store the data elements, but may consist of imputed associations with those attributes through, for example, changeable rule sets, processes or algorithms. These rule sets, processes or algorithms may be changed by user demand or via processes, that may monitor data unit usage and manipulation. The storage of data elements may be adjusted to comply with modifications in the, for example, rules sets, processes or algorithms.

In addition, the present invention may include such management information processing with respect to storage device attributes which may include, for example, empirically derived relationships that may infer boundaries, explicitly stated relationships that may stipulate boundaries, relationships that may exist only on demand and combinations of standard storage subsystem relationships such as, for example, RAID in all its forms and hierarchical storage management (HSM) in all its forms. Also, relation of the management information and the subsystem device attributes may be modified resulting in the storage of the data units having to be adjusted in which such a change of relations between the management information and the subsystem attributes include encapsulated logic. The relation between the management information and the subsystem device attributes may also include attributes of implied storage devices not present in the physical subsystem. The relation between the management information and the subsystem device attributes may also include apparently mutual exclusive sets of criteria, for example, criteria satisfied by multiple instances of data storage and criteria satisfied by storage of data at multiple layers on the storage subsystem. The relation between the management information and the subsystem device attributes may also be conditionally applied, such as, for example, between a specified criteria and a default criteria and between a plurality of specified criteria.

Figure 3:
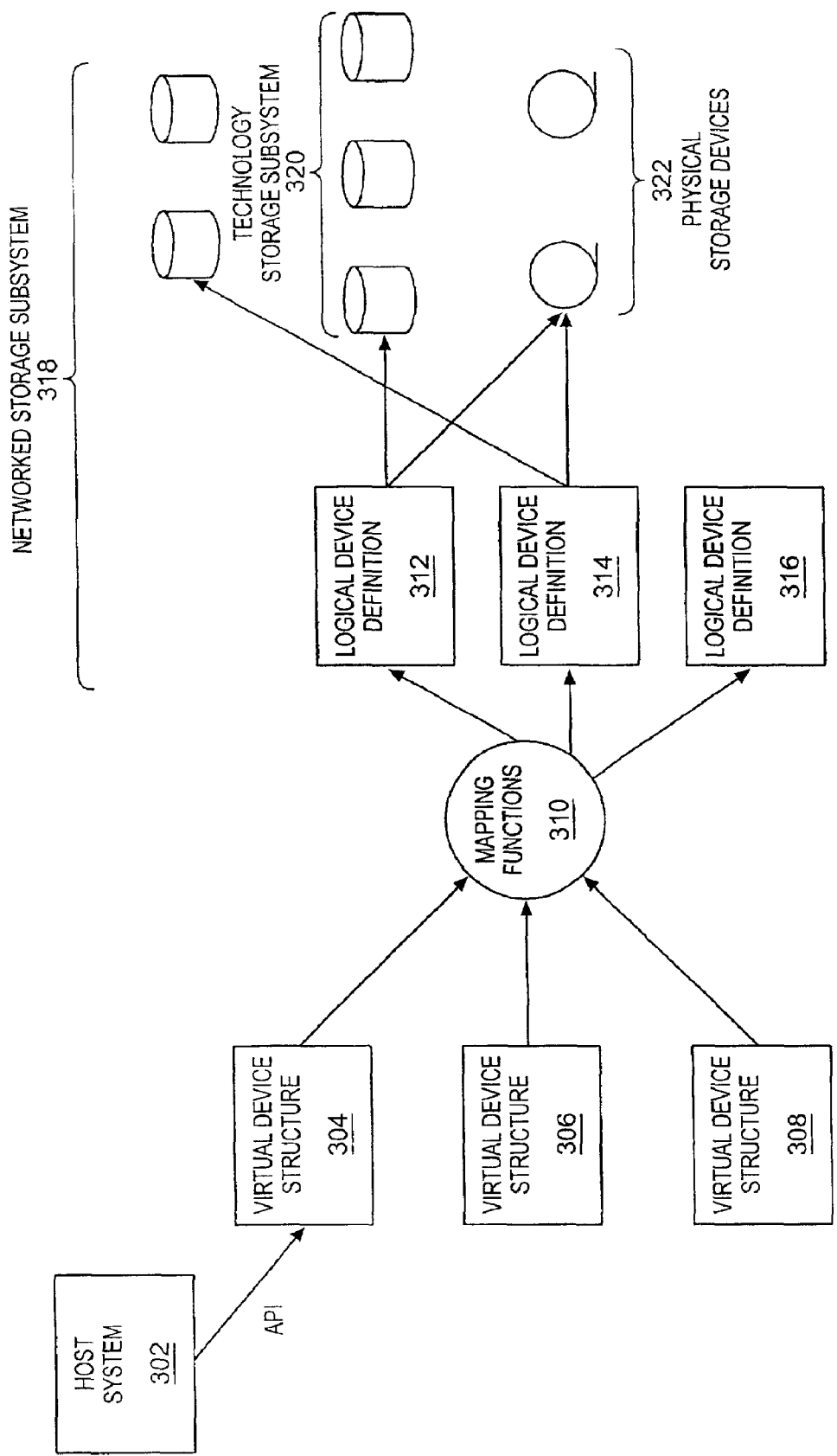
FIG. 3 is an exemplary block diagram of the conceptual relationship between the virtual device structures and the logical device structures in accordance with a preferred embodiment of the present invention.

FIG. 3 is an exemplary block diagram of the conceptual relationship between the virtual device structures and the logical device structures in accordance with a preferred embodiment of the present invention. The present invention provides a subsystem level application program interface (API) 312 from host system 302 which allows a user to construct data unit definitions or virtual devices. These data unit definitions or virtual devices, such as, for example, virtual device structures 304, 306 and 308, may be called "Virtual Device Structures" (VDS). A subsystem in turn will implement logical device structures with mapping functions 310 and mapping VDSs into the physical world managed by the subsystem. The data may be mapped into networked storage subsystem 318 which may consist of logical definitions 312, 314 and 316. Networked storage subsystem 318 may also consist of storage units 324 and 326 in which the data is stored. Also, data may be stored in technology storage subsystem 320 which may be a RAID and in physical storage devices 322. VDSs may be defined by requesting the use of performance structures like striping, redundancy structures like mirroring and demand copies, and location structures like remote location of copies or archive copies, either alone or in combination. These VDSs also may have scheduling and synchronizing information that allow complete policies to be defined within the structure. Multiple technology selections may also be used, for example, disk and tape in the same virtual device structure. The ability to modify structure rules and the ability to adjust already stored data to the new rules is also provided.

A VDS may include a subsystem virtual device definition table which may consist of, for example, the following:

Virtual Definition 1:

Performance requirements:

a) sustainable data transfer rate b) sustainable start input output (SIO) commands per second c) parallel SIO Availability requirements a) time to first accessibility of data b) time to hold off new users for consistency checks Reliability requirements a) allowed probability of data block loss b) allowed probability of data file loss Capacity Management requirements a) maximum size of data unit The definition of Performance requirements, Availability requirements, Reliability requirements and Capacity Management requirements (PARC) for each data unit is available to the owning entity to interpret and to modify the entity. The owning entity may:

1) share access to the data definition with or without the data;

2) allow the data definition to be associated with the data;

3) allow the data definition to be distributed with the data; and 4) make a copy of the definition and have more than one definition for the same data unit, wherein a) the copy process may modify one or more of the extant definitions and expect the subsystem to make the necessary changes so that the data unit will comply with all definitions;

b) the copy process may distribute data units or portions thereof with selected definitions; and c) the copy process may distribute data units or portions thereof with selected subsets of the full definition.

Storage performance, availability, reliability and capacity systems (PARCs) are dynamic subsystems that support flexible definitions of data storage requirements at the data level. The present invention is based on providing a subsystem level application program interface (API) that allows a user to request or imply a demand for the use of data storage capabilities. Such data storage capabilities may be defined by requesting capabilities associated with data units that may invoke the use of performance structures like, for example, striping, redundancy structures like mirroring and demand copies, and location or availability structures like, for example, remote location of copies or tape archives copies. These capabilities may also have scheduling and synchronizing information that may allow complete policies to be defined and associated with individual data units or sets of data units.

Therefore, the present invention anticipates future requirements by matching the definition associated with a data unit to a logical device definition with expanded capabilities, for example, using multiple sets of stripe groups to effect the availability of providing at a later date the performance of wider stripes than originally implied by the performance requested, using more layers or copies of redundancy data to later provide the ability to improve the reliability when specifications change and become higher than originally required, and actually making additional copies of the data on devices that employ different technologies possibly even in remote locations.

Figure 4:
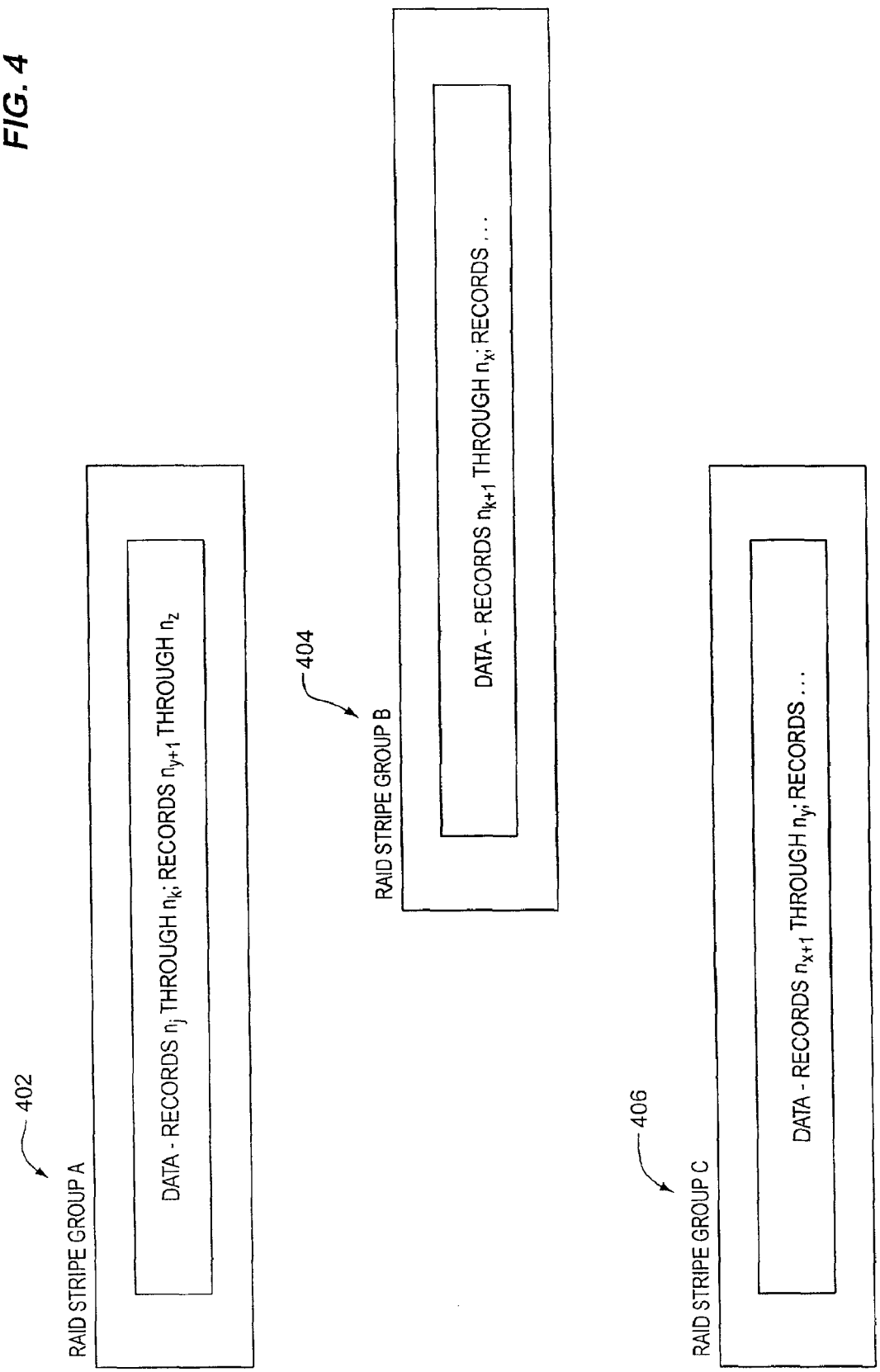
FIG. 4 is an illustration of the use of multiple RAID groups for providing potential for future higher performance requests in accordance with a preferred embodiment of the present invention.

FIG. 4 is an illustration of the use of multiple RAID groups for providing potential for future higher performance requests in accordance with a preferred embodiment of the present invention. FIG. 4 shows the use of multiple RAID groups where data may be read in parallel for records $n_j$ through $n_k$ from RAID stripe group A 402 and then records $n_{k+1}$ through $n_x$ may be read in parallel from RAID stripe group B 404 and then records $n_{x+1}$ through $n_y$ may be read in parallel from RAID stripe group C 406 and then cycling back to RAID stripe group A 402 for the next set of records $n_{y+1}$ through $n_z$. Later if performance requirements demand higher throughput records $n_j$ through $n_x$ may be read in parallel from RAID stripe group A 402 and RAID stripe group B 404 simultaneously or records $n_j$ through $n_y$ from RAID stripe group A 402, RAID stripe group B 404, and RAID stripe group C 406 simultaneously. All RAID stripe groups may be read at once up to the point of anticipated performance requirements. If all RAID stripe groups are read at once, but the system does not meet a newly imposed performance requirement, then the data may be rewritten to a higher performance capability. The present invention also provides a facility for reviewing and modifying or adjusting the interpretation of "appropriate" data storage characteristics after the data element has already been stored. The specific way in which the host systems use the data will imply additional requirements initially not specified. These new requirements may be added to the overall specification and the implementation changed to accommodate the changes.

For example, the characteristics for a data unit may be historically maintained in a meta-data record associated with that data unit and may be updated as the use of the data is monitored. Updates may then trigger subsystem activity to modify the stored characteristics for the data unit. For example, the subsystem may note that a specific portion of the data is referenced in concert with another portion and as a consequence will set staging control metadata that will fetch the anticipated data when the companion data is accessed. In addition, a facility for accepting new specifications for data storage characteristics after the data unit has been stored is provided. The ability for modifying where and/or how an already stored data unit is managed is provided, including, but not limited to the subsystem actually changing where and/or how the associated data elements are stored. The modification of data element storage may be required to meet newly interpreted or specified data unit storage characteristics. When new requirements are imposed on a set of data units and the system has not anticipated the requirements, the present invention builds a new logical device definition from the specified or interpreted data storage characteristics.

Figure 5:
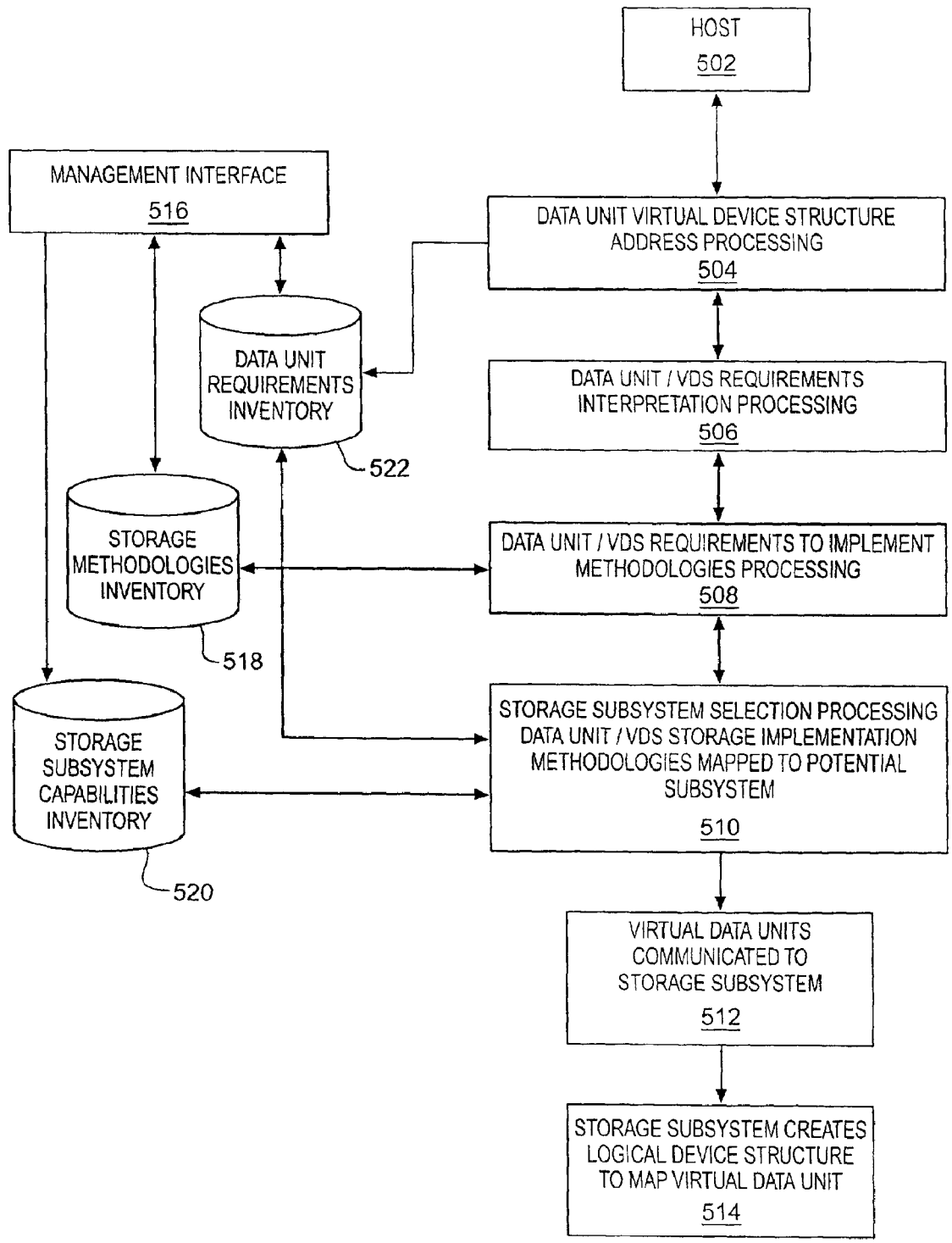
FIG. 5 is a flowchart illustrating a data unit/virtual device structure data processing methodology in accordance with a preferred embodiment of the present invention.

FIG. 5 is a flowchart illustrating a data unit/virtual device structure data processing methodology in accordance with a preferred embodiment of the present invention. A top down approach may be used by building towards characteristics of known physical device types. For a collection of data elements with a virtual data unit address understood by host system (step 502) the data unit virtual device structure address is processed (step 504). The assigned virtual address communicated to the subsystem may be the same as or different from the virtual data unit address that is known to the host system. The data unit/VDS requirements interpretation is processed (step 506), then the data units/VDS requirements are processed to map methodologies for implementation (step 508). Then the storage subsystem selection processing for the data unit/VDS identifies which storage implementation methodologies are mapped to which potential subsystems and selections for subsystem use are made (step 510). Virtual data units are then communicated to the storage subsystem or subsystems (step 512). Each storage subsystem creates a logical device structure to map the virtual data unit (step 514).

Management interface 516 may manage data unit requirements inventory 522, storage methodologies inventory 518 and receives and provides input from/to storage subsystem capabilities inventory 520. Data unit requirements inventory receives input from data unit virtual device structure address processing (step 504) and storage subsystem selection in processing data unit/VDS storage implementation methodologies when such methodologies are mapped to potential subsystems (step 510). Storage methodologies inventory 518 receives input from data and provides input to data units/VDS requirements to implement methodologies processing (step 508).

With storage virtualization, a host server is freed from the restrictions of actual storage mechanisms. Furthermore, the actual storage mechanism is freed from the restrictions of the presentation to the host server. Data storage is presented to the host server as an emulation of some device or media type or model. The data may actually be stored on one or more different types of devices and/or media. While storage management is concerned with physical characteristics of storage systems, devices and media, storage virtualization is concerned with masking the physical characteristics of storage systems and taking the control of these physical characteristics from the user or system administrator.

Figure 6:
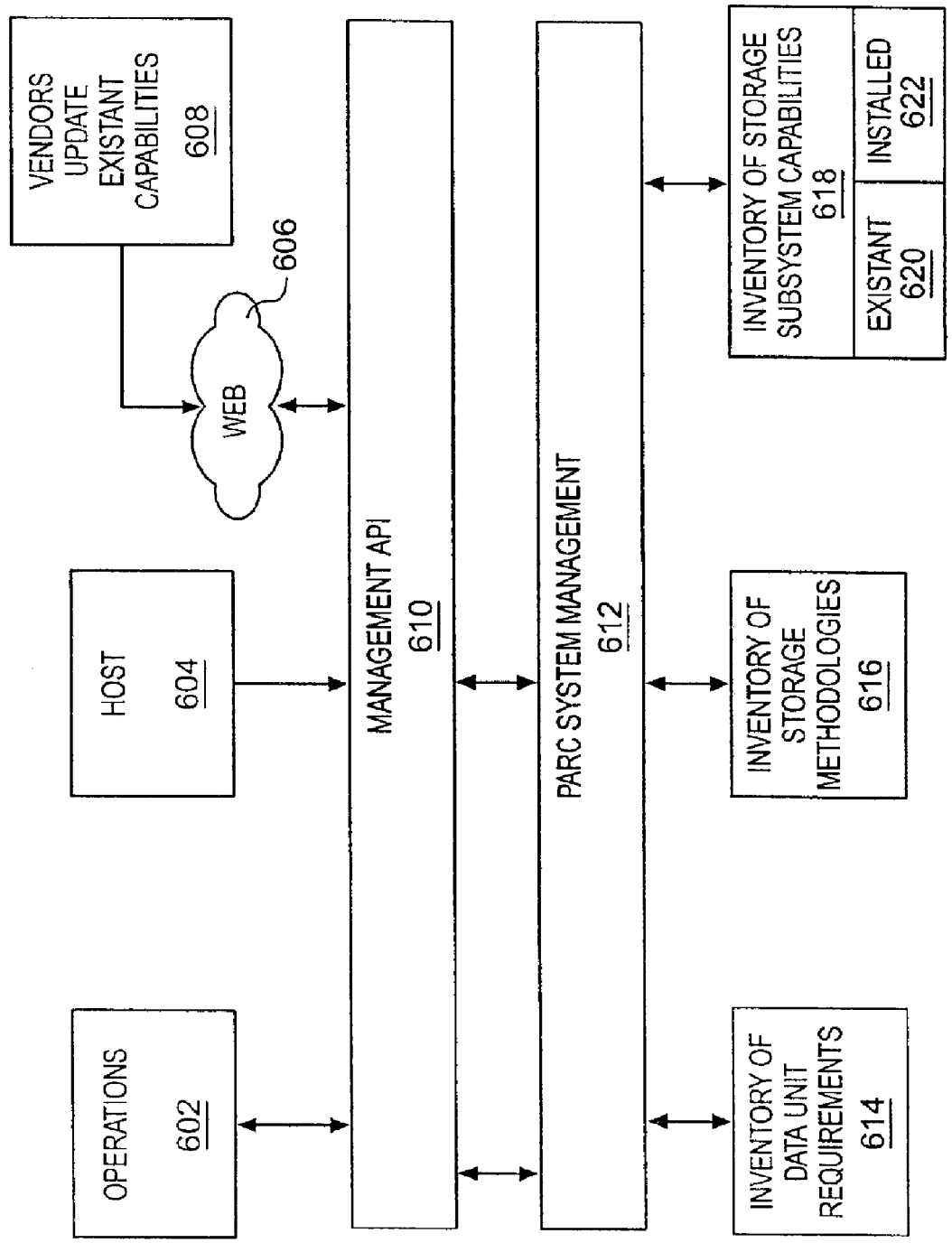
FIG. 6 is an exemplary block diagram of the management API branch illustrated in FIG. 5 in accordance with a preferred embodiment of the present invention.

FIG. 6 is an exemplary block diagram of the management API branch illustrated in FIG. 5 in accordance with a preferred embodiment of the present invention. In this example, Management API 610 may receive input from operations 602, host 604 or through vendors updating existent capabilities 608, which may be via a distributed data processing system, such as, for example, internet 606. PARC system management 612 provides input and provides output to/from management API 610. PARC system management 612 receives input from inventory of data unit requirements 614 along with inventory of storage methodologies 616 and inventory of storage subsystem capabilities 618. Inventory of storage subsystem capabilities may be made up of existent storage subsystem capabilities 620 and installed storage subsystem capabilities 622. If a data unit requirement or a storage methodology requires a particular storage subsystem capability, it needs to be determined as to whether the storage subsystem capability actually exists and, if so, whether the capability is actually installed on an available subsystem. If the storage subsystem capability is actually installed on an available subsystem, the required capability may be provided to satisfy data unit requirements 614 and/or implement a storage methodology 616. However, if the data unit requirement or the storage methodology finds no capability existent within the inventory of storage subsystem capabilities, the data unit requirement and/or the storage methodology may request updates to subsystem capabilities 618 by way of vendor update existent capabilities 608.

Furthermore, operations may be advised when existent capabilities provide a superior solution over that provided by the installed capabilities. Operations may also be informed when no solution is available utilizing the installed capabilities but may be made available via existent but not installed capabilities. Then operations may be advised when no solution may be found for the stated requirements.

Figure 7:
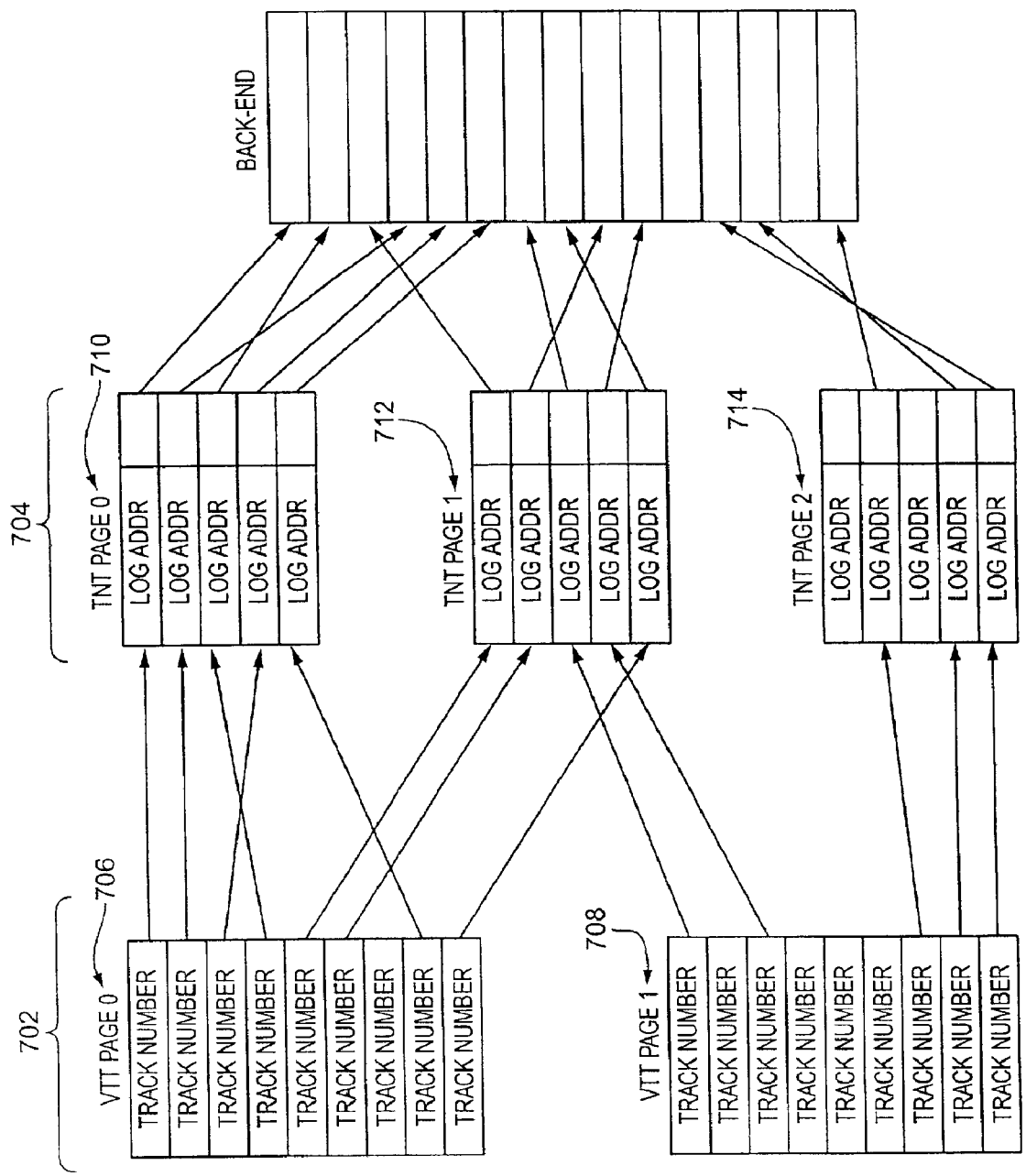
FIG. 7 is an exemplary diagram of a virtual track table and a track number table.

FIG. 7 is an exemplary diagram of a virtual track table and a track number table. Virtual track table 702 and track number table 704 are tables that may be used in a storage subsystem by a processor, such as processors 210–224 in FIG. 2. Some of the mapping schemes force the manipulation of many pointers in order to perform operations on large sets of mapped data. Some mapping schemes also force the allocation of mapping tables for all possible virtual addresses whether or not those addresses are actually used. FIG. 7 depicts prior art which is extended by the present invention.

The present invention also provides a system using a multi-layer virtual mapping tree method that provides very fast access to the mapped data locations and still minimizes the storage required for the mapping tables themselves. The multiple-layer tables allow fast lookup algorithms, but may allow only the mapping table units that point to allocated storage units to be instantiated, therefore, saving mapping table space. These multi-layer mapping tables, in the case of data copies, also allow only the mapping table units for changed data to be instantiated, again saving mapping table space.

In addition, the present invention provides for using a hidden copy/snap copy scheme where the mapped units that are involved in the snap copy are tracked in multiple ways, for example using bit maps, pointer tables, and multilayer bit maps, thereby reducing the table entries to be manipulated to perform snapshot-like operations. An improvement for some workloads and types of data is to use dynamically assigned pointer ranges to track the snap copy data, thereby possibly using less storage than bit maps. Furthermore, the present invention provides using manipulation of entire sections (i.e. subtrees) of the multi-layer virtual mapping tree to speed up operation on large sets of data and to allow additional functions that may be time consuming using other methods.

To achieve the above objectives of the present invention, the original multi-layer map tree may be modified to add map table meta-data. After modification of the original multi-layer map tree a map table section separation may be performed both in the horizontal and vertical directions. Also, the operations of promoting and demoting sections of the map table (subtrees) may be added. Therefore, this gives the present invention the added flexibility of operation and increased access to data locations while saving on map table space.

The present invention manages virtual storage facilities comprising an organization of computer equipment, for example, a host network, data transfer means, storage controller means and permanent storage means and attachment means connecting these devices together. The computer storage subsystem may be organized using multiple layers of mapping tables which may provide unique identification of the storage location of the data such that individual entries in the mapping tables are variable and may be made self-defining with respect to the amount of data managed. The layers of the tables are variable and may be made self-defining as to existence and may be implemented on a piecemeal basis. The existence of individual tables or parts of individual tables is variable and such that actual presence of any of the table information is by demand.

The present invention may also further include a range of data wherein the range of data management is correlated to the layer of the mapping tables addressed. The coordination may be, for example, an algorithm, via a pointer system, via a pointer to correlation logic or via a tree structure. The range of data managed may also be independent of the layer of the tables accessed. Mapping consistency is managed algorithmically or mapping consistency is managed via pointers to boundary information. The boundary information may include, for example, description of size of data units mapped, a description for a like set of entries, a unique description for each entry, a specified default size for a set of entries, including exception flags for modified entries and a bit map. The description of the size of the data units mapped may be by way of a pointer with an address range or a pointer with a unit size. Mapping consistency may be managed via a combination of algorithms, boundary information, and pointers to boundary information. Multiple layers may include a first level of management directing to one or more intermediate levels of management, thereby directing to a final level of management, which may provide the necessary controls to directly access the data. A means to indicate that the virtual address space mapped by an entry is not known, not used or not allocated may also be included. Therefore, individual tables in the mapping may then be able to be paged to secondary storage and brought into primary storage when needed. Tables for unallocated space may not be instantiated at all until the unallocated space is used or allocated. Boundary information may consist of, for example, fixed mapping wherein every entry in the table has the same extent and location which may be computed, variable mapping in which every entry in the table is unique and default variable in which there is a default extent size and a map of which entries are exceptions.

Figure 8:
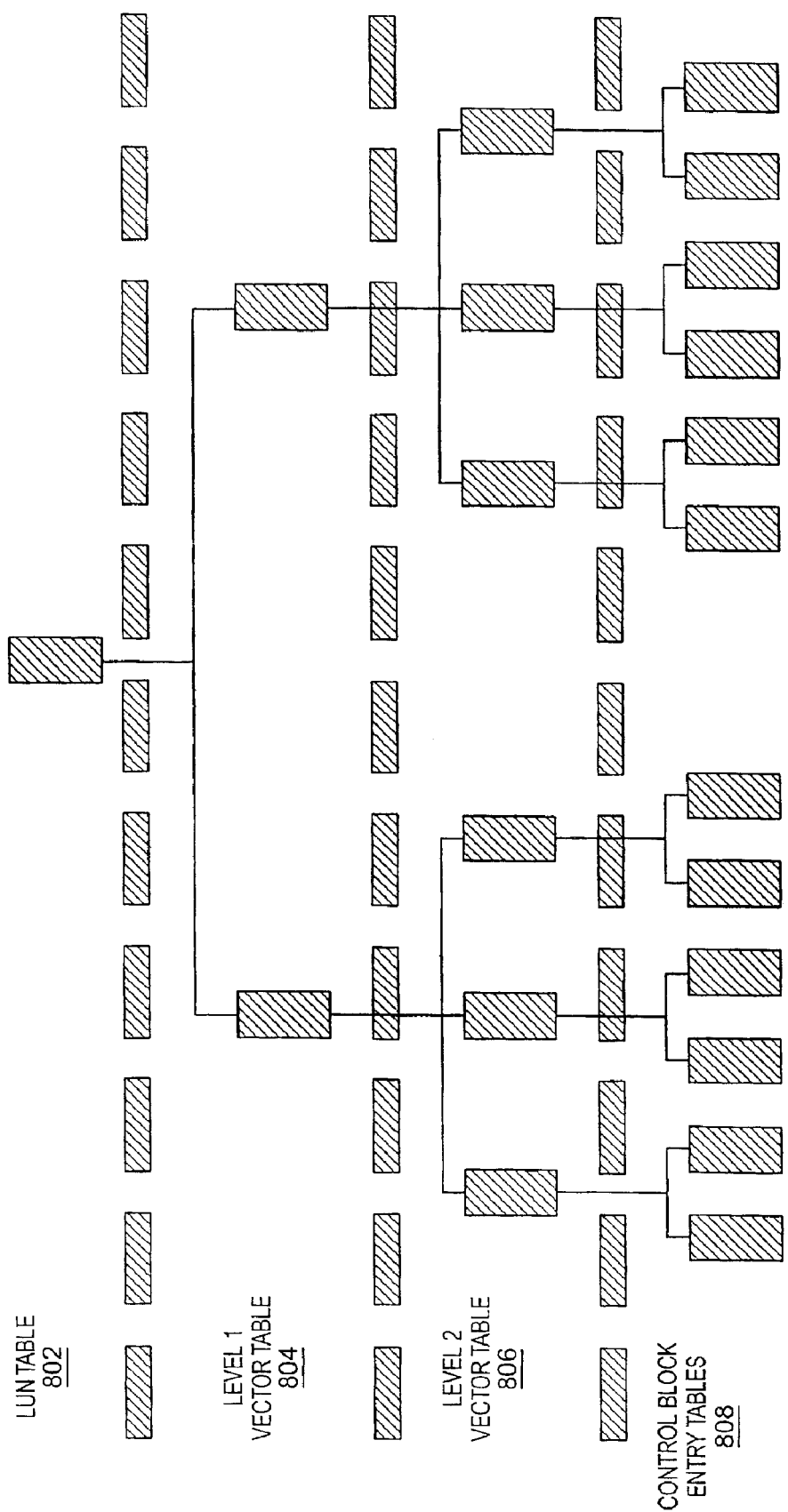
FIG. 8 is an exemplary illustration of a hierarchical relationship of a mapping table in accordance with a preferred embodiment of the present invention.

FIG. 8 is an exemplary illustration of a hierarchical relationship of a mapping table in accordance with a preferred embodiment of the present invention. A map may be made up of several layers. These layers create a hierarchy used to facilitate the location of an entry that may describe the actual location of the data. Each layer points to a finer granularity than the layer below it. For example, the level 1 vector table 804 entries each describe, for example eight gigabytes of a LUN address, each level 1 entry points to level 2 vector table 806 whose entries each describe, for example, eight megabytes of a LUN address. The amount of space required to store layers 802 and 804 is small enough in this example so that dedicated memory may be set aside to hold them, thereby ensuring that any access requiring data stored in either level 802 or 804 will be found. Therefore, hits at these levels (802 & 804) will speed the processing of the mapping tables.

In this example, LUN table 802 is a vector table with, for example, 256 entries, in which LUN table 802 is indexed by combining target and LUN addresses. There is one entry for each target and LUN combination. The entry contains a vector to the next table in level 1 vector table 804 layer or contains a null value if no target address of LUN address has been created. LUN table 802, in this example, requires 1024 bytes of memory. LUN table 802 may be pinned in memory.

Level 1 vector table 804 contains, in this example, 256 entries that represent the LUN eight gigabyte segments. Level 1 vector table 804 is indexed by using the most significant byte or bits 31–24 of the logical block address. Each entry either contains a vector to level 2 table 806 or contains a null value. While the space to store all the level 1 804 pointers is reserved, in this example, for 256 entries, level 2 table 806 is only populated with enough entries to represent the size of the host LUN. That is, if the host LUN has a capacity of, for example, 50 gigabytes, there may be seven entries in level 1 vector table 804. Level 1 vector table 804 requires, for example, up to 256K of memory. Level 1 vector table 804 is also pinned in memory.

Level 2 vector table 806 contains, in this example, 1024 entries and is indexed by bits 23–14 of the logical block address. The entries in level 2 vector table 806 may contain either a pointer to a control block table or a null value. As each level 2 vector table 806 represents, for example, eight gigabytes of LUN address, a null value may be present for addressed that exceed the capacity of the LUN up to, for example, eight gigabytes of boundary. Each entry in level 2 vector table 806 represents, for example, eight megabytes of LUN address. Level 2 vector table 806 may require, for example, 4096 bytes of memory and is pageable. Level 2 vector table 806 may have a higher priority than control block table 808 and may only be swapped out of the table memory space to make room for more table information when necessary (i.e., when no lower level table information is available to be swapped out).

The lowest layer, in this example, in the map is control block table 808. Control block table 808 is made up of, for example, 256 control block entries. Bits 13–6 of the logical block address are used as an index into control block table 808. Control block table, in this example, represents eight megabytes of the LUN address. Each control block table 808 requires, for example, 4096 bytes of memory. Control block table 808 is pageable and may have a lower priority than level 2 vector table 806 and may be swapped out of the mapping table memory space to make room for more entries (e.g., other level 808 entries) before level 2 vector table 806 is swapped. Control block table 808 may be swapped on a LRU basis.

Figure 9:
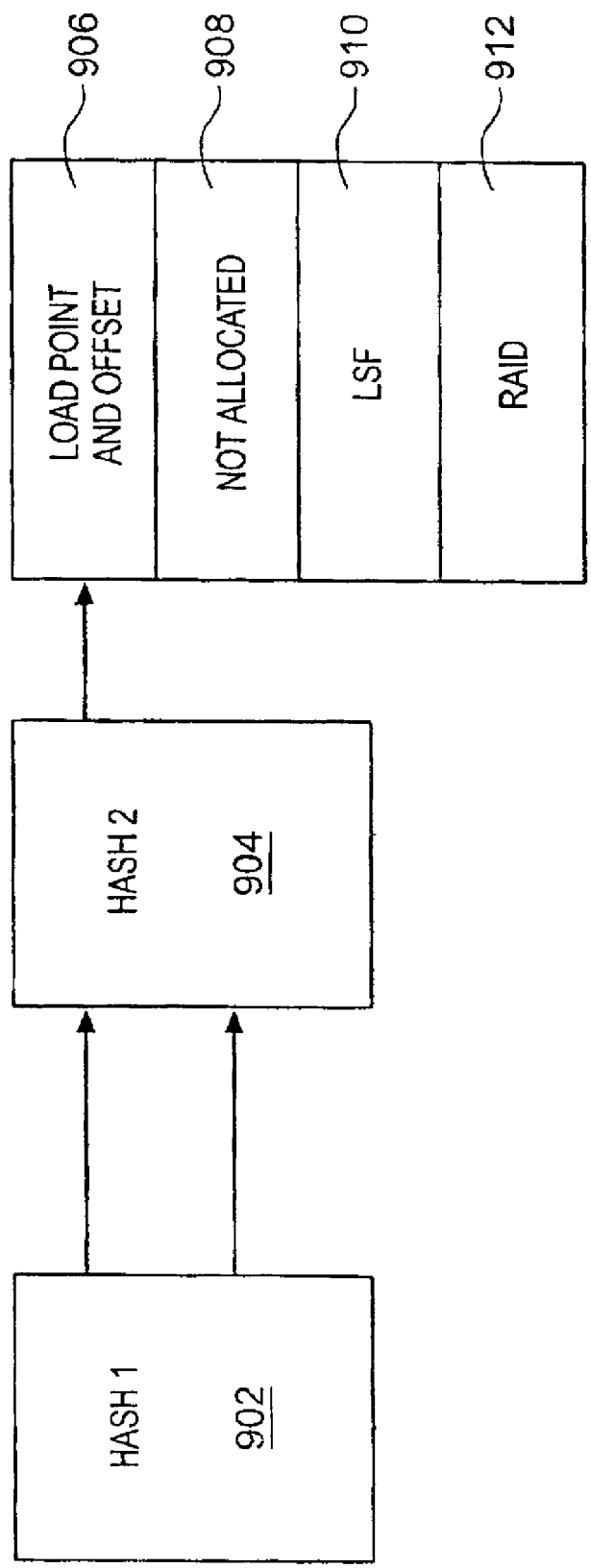
FIG. 9 is an exemplary diagram of a portion of a mapping table describing an address range with four distinct sections in accordance with a preferred embodiment of the present invention.

FIG. 9 is an exemplary diagram of a portion of a mapping table describing an address range with four distinct sections in accordance with a preferred embodiment of the present invention. Hashing algorithms are a well known mechanism for storage subsystems to manage space and resolve an input address to a physical storage location. Hash algorithm 1 902 and hash algorithm 2 904 are serially implemented algorithms that may be used in a storage subsystem by a processor, such as processors 210–224 in FIG. 2. Hash 2 algorithm 904 may resolve to several sections. Each section may in turn be mapped using different mapping techniques, such as, for example, load point and offset section 906, not allocated section 908 logged structured file (LSF) section 910 and RAID section 912.

Figure 10:
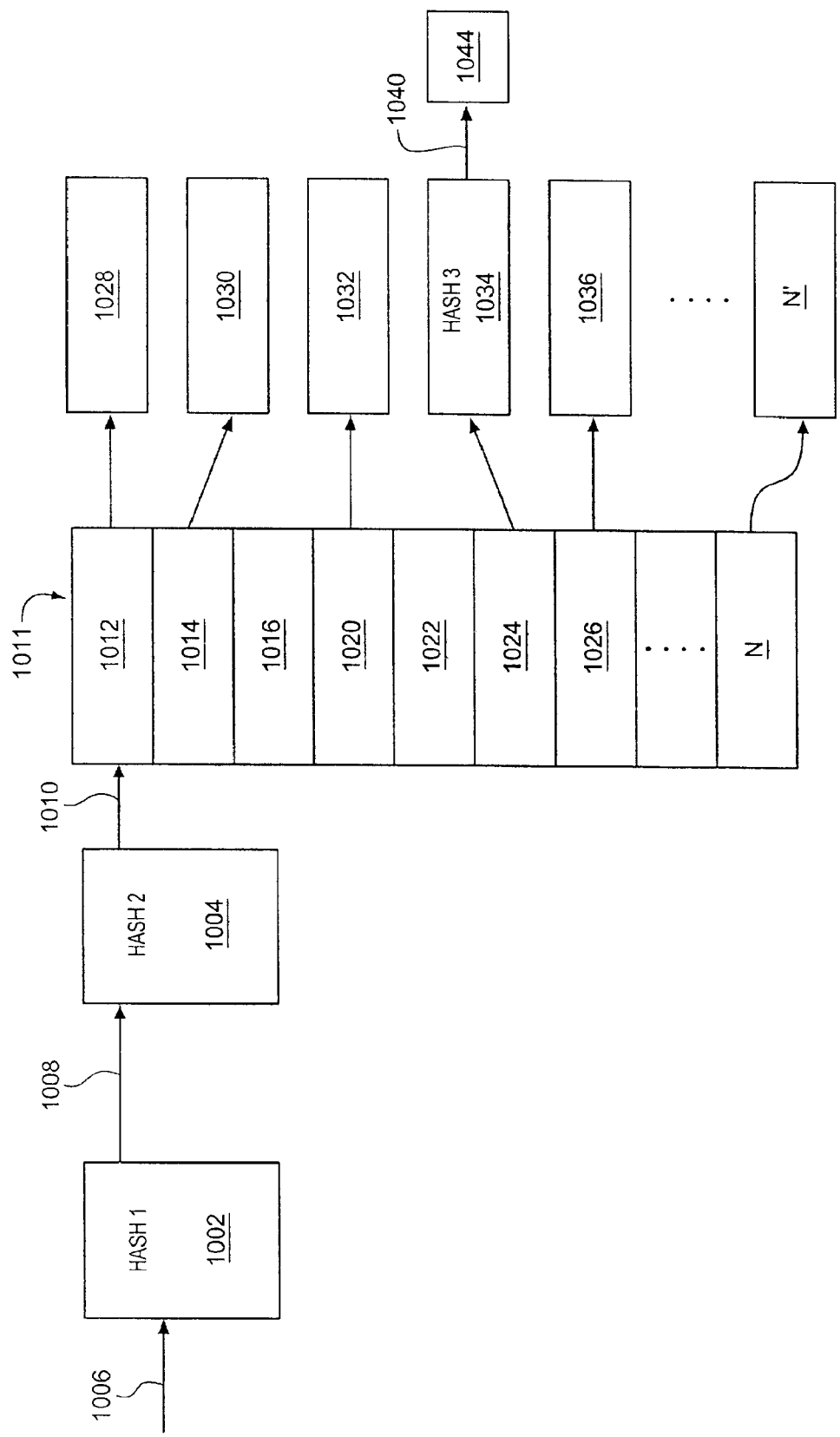
FIG. 10 is an exemplary block diagram of a multi-layer mapping table in accordance with a preferred embodiment of the present invention.

FIG. 10 is an exemplary block diagram of a multi-layer mapping table in accordance with a preferred embodiment of the present invention. Hash algorithm 1 1002 produces hash values as output. Logical address in 1006 is input into hash table 1002. Hash algorithm 1 1002 may not require modification due to dynamic changes to the mapping. Hash algorithm 1 1002 may only need modification to reflect logical device definition changes. Hash value out 1008 is input into hash algorithm 2 1004. Hash algorithm 2 1004 may be modified as the mapping changes. Hash value output 1010 from hash algorithm 2 1004 is input into pointer table 1011. Pointer table 1011 consists of pointer entries 1012-N. The pointer changes as the mapping changes. Hash algorithm 2 1004 and pointer table 1011 are held consistent with respect to range. Also included are mapping table endpoints 1028, 1030, 1032, 1034, 1036 and N'. Mapping table endpoints 1028-N' can be omitted, for example, in the case of unallocated space. Mapping table endpoints 1028-N' may be a single entry or a complex set of entries and further logic, for example, such as hash algorithm 3 1034 which produces hash output 1040 which is an input to hash table 1044. The total number of mapping table entry points may vary dynamically during use as the table entries are modified.

Figure 11:
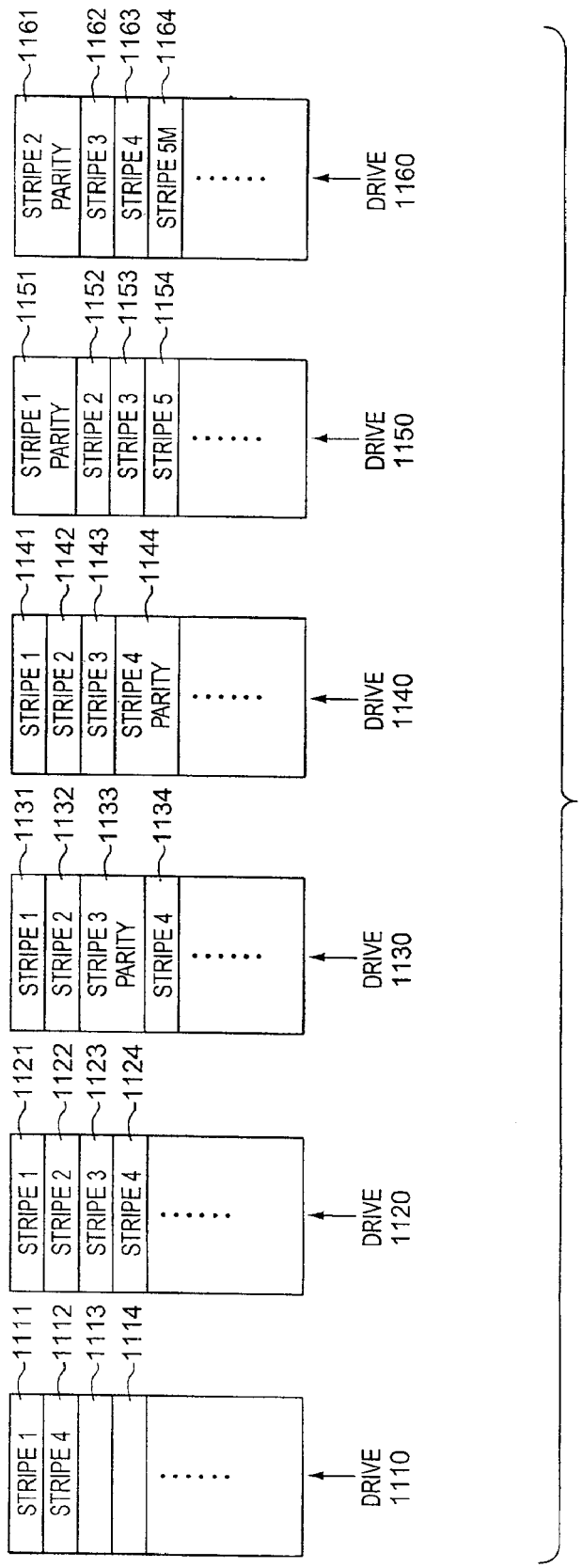
FIG. 11 is an exemplary illustration of FlexRAID in accordance with the preferred embodiment of the present invention.

FIG. 11 is an exemplary illustration of FlexRAID in accordance with the preferred embodiment of the present invention. FlexRAID allows a controller software to place RAID stripes or mirrors across any of the drives attached to the controller software. Conventional RAID systems bind sets of drives together to form a RAID set. These Raid sets may determine the RAID level for the LUN they represent. For example, a set of five drives may be bound together in a RAID set. This RAID set of five drives may be presented to a host as a LUN structure and a self-describing RAID stripe or mirror.

In an architecture with a paging LSF map structure, data locations referenced by a computing system may not be updated in a fixed location. Data is located by a translation table identifying the current residency address of the data. This permits the data to be relocated anywhere in the subsystem while maintaining a logically consistent address to the host computer system.

By expanding on this concept, a RAID group may be thought of as a single stripe with a RAID type attribute. For example, each RAID stripe written may be thought of as a RAID stripe group. Therefore, since static binding of disk drives may not be required, a collection of disk drives may be scattered on a "best fit algorithm" across any or all members of the storage pool. Thus, disk drives may be added to the storage pool without requiring conformance to disk geometry or topology attributes.

The present invention obtains a unit of allocation for the RAID stripe from a set of disk drives. The set may be the minimal number of disks necessary for the required stripe size. However, unlike conventional RAID disk subsystems, the set may include a grouping of disks, none of which is the same type and model as the others. The stripe may be spread across the subset of the set of drives where the subset consists of the required number of units for the RAID stripe. The next stripe written may include some of the drives for the previous stripe, but also some drives in the domain which may better satisfy a space and load balance fit.

In this example, a set of disk drives, such as, disk drives 1110, 1120, 1130, 1140, 1150 and 1160 are shown. In this example, disk drive 1110 has a capacity of 500 allocation units. The other disk drives 1120–1160 have a capacity of 1000 allocation units of space. A RAID stripe, for example, RAID stripe 1 1111, is a 4+1 RAID 4 group. Four allocation units for data, for example, stripe locations 1111, 1121, 1131 and 1141, each on a different disk drive, are combined with 1 allocation unit for parity data at location 1151 to be written as one stripe. The data units are not required to be symmetrical in location, such as, occupying the same physical addresses on the disk. Each unit is maintained as a discrete unit and not tied geometrically to the other units.

Following the allocation and RAID stripe 1 write, four disk drives, for example, disk drives 1120, 1130, 1140 and 1150, have 999 data allocation units free and available for allocation, while disk drive 1110 has 499 allocation units free and disk drive 1160 still has 1000 allocation units free. Disk drives 1110, 1120, 1130, 1140 and 1150 each have 1 data allocation unit not available (i.e., allocated and written).

Then the next data write operation is initiated for stripe 2 also a 4+1 RAID level four group. The space management mechanism acquires five more data allocation units, such as, for example stripe locations 1122, 1132, 1142 and 1152, four for data and one for parity data at stripe location 1161. As a result, disk drive 1160 with 1000 units available is selected to provide one allocation unit. Following this allocation and RAID stripe write, disk drive 1110 has 499 units free for allocation, the next four disk drives, for example, disk drives 1120, 1130, 1140 and 1150 have 998 units free for allocation and drive 1160 has 999 units free for allocation.

In a similar fashion, stripe 3 may be allocated and written to stripe locations 1123, 1133, 1143, 1153 and 1162. In addition, stripe 4 may be written as a different RAID group size, for example as a 3+1 RAID group and may be allocated and written to locations 1124, 1134, 1144 and 1163. Furthermore, a different RAID level may be used, for example, stripe 5 may be written as a mirror (RAID level 1) using locations 1154 and 1164.

Various algorithms may be used to determine which disk drives and which allocation units on the disk drives are to be allocated for a new stripe. This may include, but is not limited to, the following:

a) the allocation priority may be set by which disk drives have the most number of free allocation units;

b) the highest percentage of free allocation units;

c) the allocation units closest to the most recent previous stripe write;

d) the allocation may be based on selecting the highest or lowest performance disk drive first;

e) prorated allocation based on trying to fill a certain number of drives such that they all reach maximum capacity simultaneously independent of device capacity; or e) any combination of the above.

In addition to the allocation of stripes freely across the disk drives in a pool of disk drives, the present invention allows for the stripes to use different RAID configurations. For example, one RAID stripe may be stored as a 4+1 RAID 5 configuration, while the next stripe may be stored as a simple 1+1 mirror, and further, the next stripe may be stored as a 3+1 RAID 4 configuration.

Figure 12:
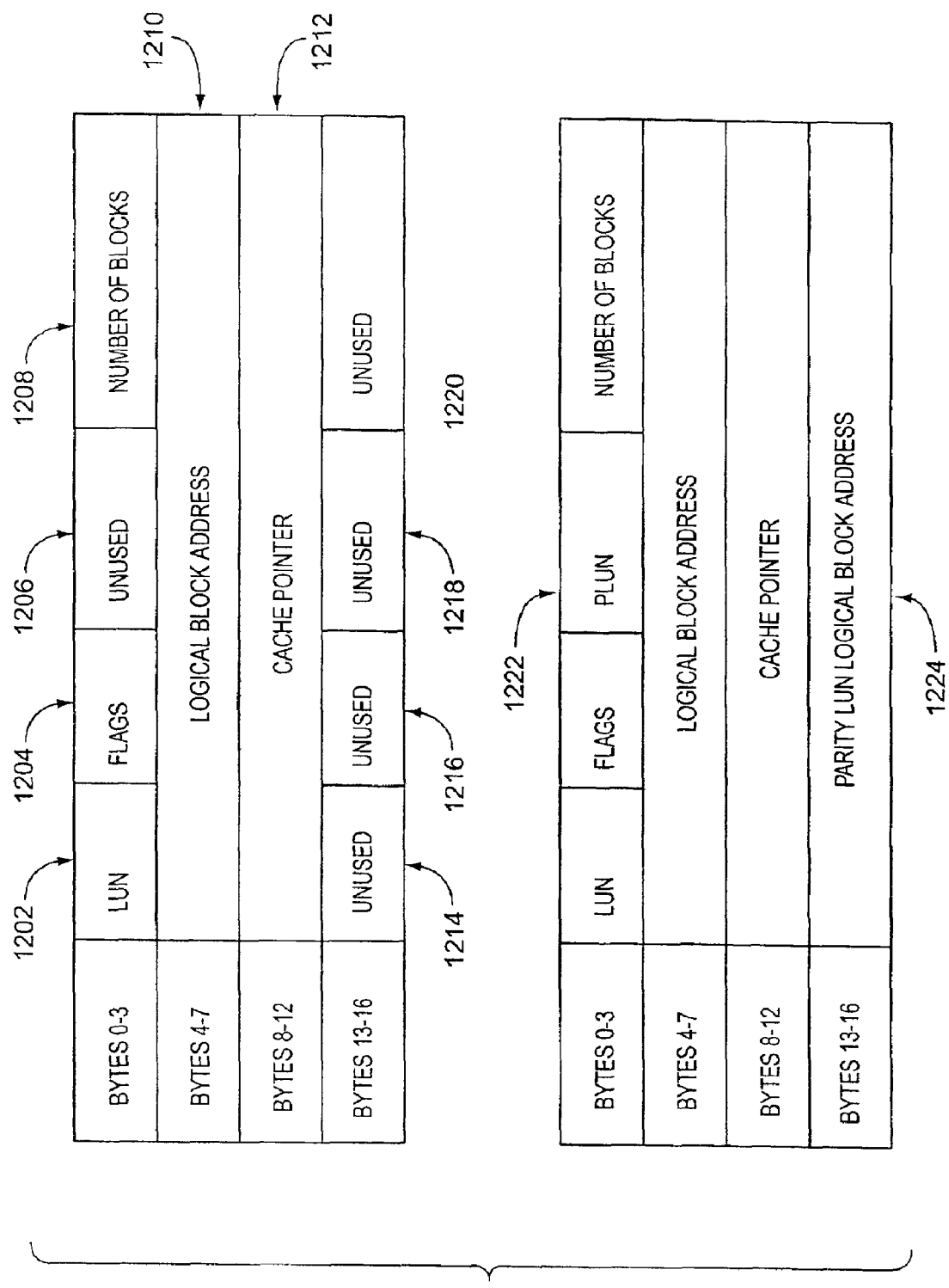
FIG. 12 is an exemplary illustration of a control block entry format and modifications to the control block entry in accordance with a preferred embodiment of the present invention.

FIG. 12 is an exemplary illustration of a control block entry format and modifications to the control block entry in accordance with a preferred embodiment of the present invention. A control block entry which, for example, may be contained within control block entry table 808 in FIG. 8 may contain the following format:

Bytes 0–3 may contain:

LUN 1202 is the LUN address of a back-end storage device that contains data;

Flags 1204 is made of up to four one-bit flags. In this example, only two flags are identified:

Update flag which indicates that data in a cache has been updated and the data on the LUN is no longer current Busy flag which indicates the data is in transition and should not be altered at this time;

Unused byte 1206; and

Number of blocks 1208 which is the number of blocks used to contain a 32K byte entry. Number of blocks 1208 is required for compression as it allows variable length entries to be written to a disk.

Bytes 4–7 may contain:

Logical Block Address 1210 which is the Logical Block Address on the data on the LUN.

Bytes 8–12 may contain:

Cache pointer 1212 which is used in conjunction but not in place of the LUN/LBA address. If an entry is in cache, cache pointer 1212 contains a pointer to the cache entry.

Bytes 13–16 may contain:

Unused bytes 1214–1220.

However, in order to provide RAID recovery, the mapping structure may be modified to identify either the parity drive associated with the RAID stripe or another drive in the mirrored set. The modifications to the control block entry may be:

Bytes 0–3 may contain in addition to LUN 1202, Flags 1204 and Number of Blocks 1208 as described above, Parity LUN 1222. In addition, Bytes 13–16 may contain Parity LUN Logical Block Address 1224 instead of unused bytes 1214–1220. Parity LUN 1222 is the LUN address of the drive containing either the parity information for the RAID stripe or another drive n the mirrored set containing host information. Parity LUN Logical Block Address 1224 is the logical block on PLUN 1222 that the parity is written to.

Another important feature of FlexRAID is the self-describing nature of data. Each stripe in the stripe contains information that describes the contents of the stripe and the stripe's relation to other member of the stripe.

A difference between FlexRAID and a conventional RAID system is that meta-data is associated with each stripe. As each data strip is written the meta-data is prefaced to the stripe. The meta-data written to the parity disk may be actually an XOR'ed parity of other pieces of meta-data. The meta-data may be, for example, one 512 byte block long and may contain the information as shown in FIG. 13 which is an exemplary meta-data block in accordance with a preferred embodiment of the present invention.

Figure 14:
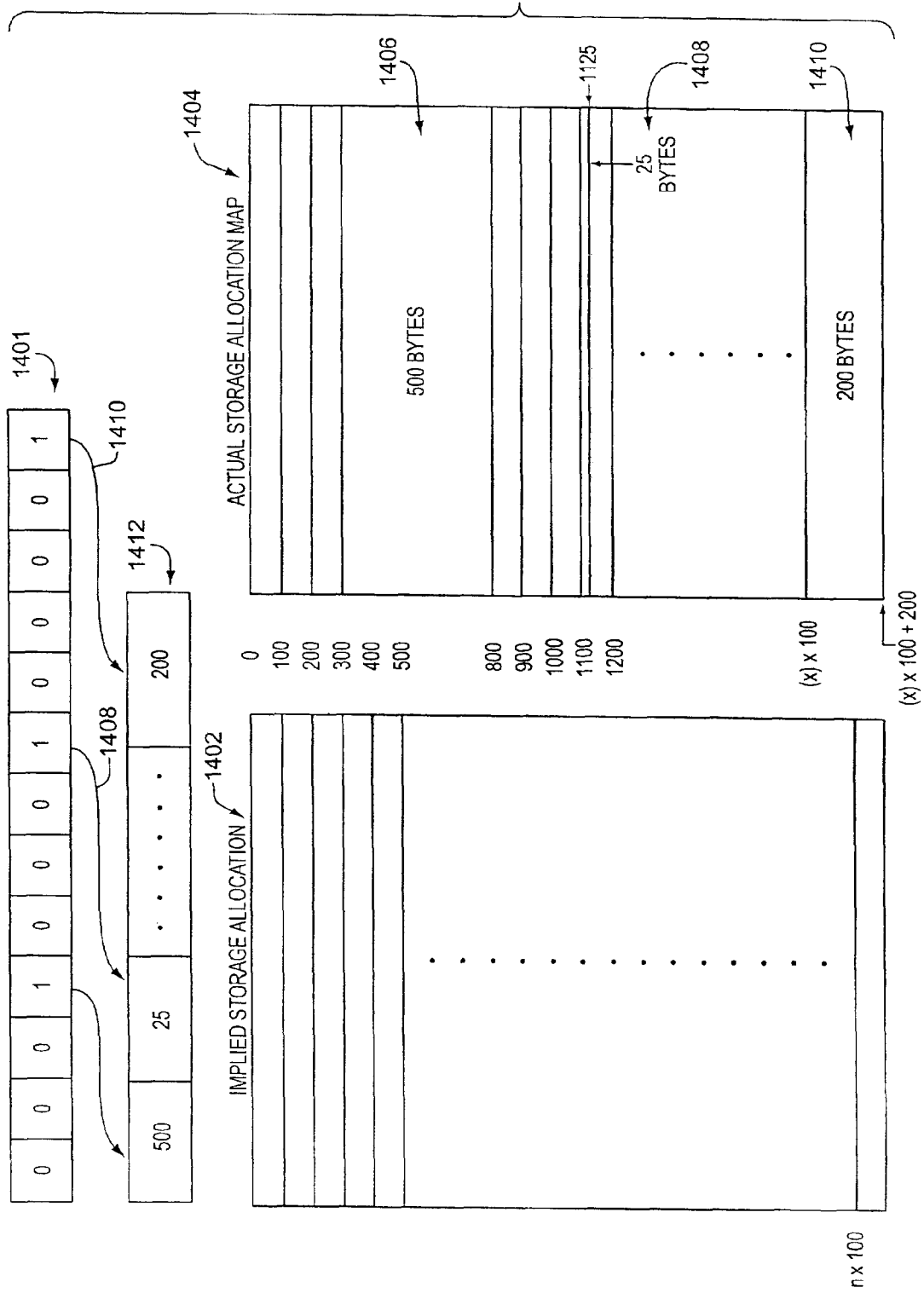
FIG. 14 is an exemplary example of a default variable within boundary information in accordance with a preferred embodiment of the present invention.

FIG. 14 is an exemplary example of a default variable within boundary information in accordance with a preferred embodiment of the present invention. There may be a default extent size and a map of which entries are exceptions 1401. In this example, assume a layer n with table $n_a$ and entry x. Also, assume a location xx in which a first extent begins. An extent is EE bytes in size, however, in this example, each extent is 100 sectors. Except as noted in an exception map 1401, the location of the extent may be calculated up to an exception point. A map of storage such as map 1402, is implied by the algorithm and may be calculated so map 1402 may not even be stored until exceptions exist.

Entry 1406, which in this example is 500 bytes in size, is stored in exception size table 1412. In addition, entry 1408, which is 25 bytes in size, is stored in exception size table 1412. Additional entries may be stored in exception size table 1412 up to nth entry 1410 which is 200 bytes in size. Implied map 1402 is implied by a regular mapping every 100 sections up to n×100 sections.

As shown in FIG. 14, actual storage allocation map 1404 will require the entries from maps 1401 and 1412 to interpret addresses. Since the first three entries in map 1401 are empty, the first data entry stored in map 1412 is entry 1406 which, in this example, is 500 bytes in size. Therefore, entry 1406 will be stored in map 1412 and redirects address calculations beginning at the third 100 sector entry. The data associated with entry 1406 will be stored from 300 to 800 in actual storage map 1404. Since the next three entries in map 1401 are empty, entry 1408 will be stored in map 1412 and control addressing beginning at 1100. This takes into account the end of entry 1406 which is at 800 in storage allocation map 1404 plus the spaces for the next three empty entries in map 1401. Entry 1408 is 25 bytes in size. Therefore, data for entry 1408 will be stored beginning at 1100 in storage allocation map 1404 and ending at 1125 in storage allocation map 1404. Then entry 1410 will be stored in map 1412. Since the entries after entry 1408 are empty in map 1401, data for nth entry 1410 will be stored in storage allocation 1404 at a location x times 100 from 1125 which is the end of entry 1408 in storage allocation 1404. Nth entry 1410 is 200 bytes in size. Therefore, since nth entry 1410 is the last entry in map 1412, storage allocation 1404 ends at a value of 1125 plus x times 100 plus the 200 bytes represented by nth entry 1410.

Therefore, the present invention provides a system using a multi-layer virtual mapping scheme where the mapped units that are involved in managing storage allocation are tracked using a bit map and an exception table, thus reducing the table entries to be manipulated to perform storage management operations.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, CD-ROMS, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for mapping a virtual address space into block addresses of at least one data storage device, the method comprising:

generating in a data processing system a hierarchical data structure in a primary storage;

wherein the hierarchical data structure includes a plurality of layers arranged according to a hierarchy;

wherein the plurality of layers include at least a highest layer and a lowest layer;

wherein each layer in the hierarchical data structure includes at least one set of data entries;

wherein each data entry in each layer represents a range of the virtual address space;

wherein for each layer in the hierarchical data structure for which there exists an next lowest layer, each data entry is correlated to a set of data entries in the next lowest layer according to a correlation scheme;

wherein each data entry in the lowest layer corresponds to both a virtual address range in the virtual address space and a block address corresponding to a physical data block in the at least one data storage device;

wherein each data entry contained within the primary storage corresponds to a virtual address range that is currently occupied with stored data, such that none of the data entries corresponds to only unused physical storage;

wherein each physical data block in the at least one data storage device contains virtual address information that identifies at least one corresponding location in the virtual address space for that physical data block; and wherein at least some of the data entries in each layer represent virtual address ranges of a homogeneous size corresponding to that layer.

2. The method of claim 1, further comprising:

swapping sub-hierarchies of data entries between the hierarchical data structure in primary storage and a secondary storage.

3. The method of claim 1, wherein at least some of the data entries in the lowest layer include a device address identifying an individual storage device in the at least one data storage device.

4. The method of claim 1, wherein the correlation scheme is one of an algorithm, a hash algorithm, a pointer system, and a pointer to correlation logic.

5. The method of claim 1, further comprising:

generating a second data structure, wherein the second data structure identifies exceptional data entries in the hierarchical data structure, wherein each individual exception data entry corresponds to a virtual address range a size that differs from the homogeneous size corresponding to that layer to which the individual exceptional data entry belongs.

6. The method of claim 1, wherein the virtual address information identifies a plurality of corresponding locations in the virtual address space for the physical data block.

7. A computer program product in a computer-readable medium for mapping a virtual address spare into block addresses of at least one data storage device, the computer program product comprising:

instructions for generating a hierarchical data structure in a primary storage;

wherein the hierarchical data structure includes a plurality of layers arranged according to a hierarchy;

wherein the plurality of layers include at least a highest layer and a lowest layer;

wherein each layer in the hierarchical data structure includes at least one set of data entries;

wherein each data entry in each layer represents a range of the virtual address space;

wherein for each layer in the hierarchical data structure for which there exists an next lowest layer, each data entry is correlated to a set of data entries in the next lowest layer according to a correlation scheme;

wherein each data entry in the lowest layer corresponds to both a virtual address range in the virtual address space and a block address corresponding to a physical data block in the at least one data storage device;

wherein each data entry contained within the primary storage corresponds to a virtual address range that is currently occupied with stored data, such that none of the data entries corresponds to only unused physical storage;

wherein each physical data block in the at least one data storage device contains virtual address information that identifies at least one corresponding location in the virtual address space for that physical data block; and wherein at least some of the data entries in each layer represent virtual address ranges of a homogeneous size corresponding to that layer.

8. The computer program product of claim 7, further comprising:

instructions for swapping sub-hierarchies of data entries between the hierarchical data structure in primary storage and a secondary storage.

9. The computer program product of claim 7, wherein at least some of the data entries in the lowest layer include a device address identifying an individual storage device in the at least one data storage device.

10. The computer program product of claim 7, wherein the correlation scheme is one of an algorithm, a hash algorithm, a pointer system, and a pointer to correlation logic.

11. The computer program product of claim 7, further comprising:
instructions for generating a second data structure, wherein the second data structure identifies exceptional data entries in the hierarchical data structure, wherein each individual exception data entry corresponds to a virtual address range a size that differs from the homogeneous size corresponding to that layer to which the individual exceptional data entry belongs.

12. The computer program product of claim 7, wherein the virtual address information identifies a plurality of corresponding locations in the virtual address space for the physical data block.

13. A data management system for mapping a virtual address space into block addresses of at least one data storage device, the data management system comprising:
means for generating a hierarchical data structure in a primary storage;
wherein the hierarchical data structure includes a plurality of layers arranged according to a hierarchy;
wherein the plurality of layers include at least a highest layer and a lowest layer;
wherein each layer in the hierarchical data structure includes at least one set of data entries;
wherein each data entry in each layer represents a range of the virtual address space;
wherein for each layer in the hierarchical data structure for which there exists an next lowest layer, each data entry is correlated to a set of data entries in the next lowest layer according to a correlation scheme;
wherein each data entry in the lowest layer corresponds to both a virtual address range in the virtual address space and a block address corresponding to a physical data block in the at least one data storage device;
wherein each data entry contained within the primary storage corresponds to a virtual address range that is currently occupied with stored data, such that none of the data entries corresponds to only unused physical storage;
wherein each physical data block in the at least one data storage device contains virtual address information that identifies at least one corresponding location in the virtual address space for that physical data block; and
wherein at least some of the data entries in each layer represent virtual address ranges of a homogeneous size corresponding to that layer.

14. The data management system of claim 13, further comprising:
means for swapping sub-hierarchies of data entries between the hierarchical data structure in primary storage and a secondary storage.

15. The data management system of claim 13, wherein at least some of the data entries in the lowest layer include a device address identifying an individual storage device in the at least one data storage device.

16. The data management system of claim 13, further comprising:
means for generating a second data structure, wherein the second data structure identifies exceptional data entries in the hierarchical data structure, wherein each individual exception data entry corresponds to a virtual address range a size that differs from the homogeneous size corresponding to that layer to which the individual exceptional data entry belongs.

17. The data management system of claim 13, wherein the virtual address information identifies a plurality of corresponding locations in the virtual address space for the physical data block.

18. A method for mapping a virtual address apace into block addresses of at least one data storage device, the method comprising:
generating in a data processing system a hierarchical mapping table in a primary storage subsystem;
wherein the hierarchical mapping table includes a plurality of layers arranged according to a hierarchy;
wherein the plurality of layers include at least a highest layer and a lowest layer;
wherein each layer in the hierarchical mapping table includes at least one set of data entries;
wherein each data entry in each layer represents a range within the hierarchical mapping tables;
wherein for each layer in the hierarchical data structure for which there exists an next lowest layer, each data entry is correlated to a set of data entries in the next lowest layer according to a virtual mapping scheme;
wherein each data entry in the lowest layer corresponds to both a mapping table address range in the hierarchical mapping tables and a block entry corresponding to a physical data block in the at least one data storage device;
wherein each data entry contained within a data storage subsystem corresponds to the mapping table address range that is currently occupied with stored data, such that none of the data entries corresponds to only unused physical storage;
wherein each physical data block in the at least one data storage device contains virtual address information that identifies at least one corresponding location in the virtual address space for that physical data block; and
wherein at least some of the data entries in each layer represent virtual address ranges of a homogeneous size corresponding to that layer.

* * * * *